United States Patent
Dunbar et al.

(10) Patent No.: US 11,588,683 B2
(45) Date of Patent: Feb. 21, 2023

(54) STITCHING ENTERPRISE VIRTUAL PRIVATE NETWORKS (VPNS) WITH CLOUD VIRTUAL PRIVATE CLOUDS (VPCS)

(71) Applicant: Huawei Technologies Co., Ltd., Shenzhen (CN)

(72) Inventors: Linda Dunbar, Plano, TX (US); Katherine Zhao, Mountain View, CA (US)

(73) Assignee: Huawei Technologies Co., Ltd., Shenzhen (CN)

(*) Notice: Subject to any disclaimer, the term of this patent is extended or adjusted under 35 U.S.C. 154(b) by 97 days.

(21) Appl. No.: 16/995,706

(22) Filed: Aug. 17, 2020

(65) Prior Publication Data
US 2020/0412608 A1    Dec. 31, 2020

Related U.S. Application Data

(63) Continuation of application No. PCT/US2019/018721, filed on Feb. 20, 2019.
(Continued)

(51) Int. Cl.
*H04L 41/0806* (2022.01)
*G06F 9/455* (2018.01)
(Continued)

(52) U.S. Cl.
CPC ...... *H04L 41/0806* (2013.01); *G06F 9/45558* (2013.01); *H04L 12/4633* (2013.01);
(Continued)

(58) Field of Classification Search
CPC ............ H04L 41/0806; H04L 12/4633; H04L 12/4641; H04L 12/66; H04L 45/24;
(Continued)

(56) References Cited

U.S. PATENT DOCUMENTS 7,546,349 B1 *  6/2009  Cooley ................ G06Q 10/107
                                                   709/224
7,558,829 B1 *  7/2009  Perlman ................ H04L 51/212
                                                   709/206
(Continued)

FOREIGN PATENT DOCUMENTS

CN       102387061 A      3/2012
CN       103036919 A      4/2013
(Continued)

OTHER PUBLICATIONS

Chinese Office Action dated Mar. 2, 2021, CN Application No. 201980013697.7.
(Continued)

*Primary Examiner* — Ninos Donabed
(74) *Attorney, Agent, or Firm* — Vierra Magen Marcus LLP

(57) ABSTRACT

Techniques are presented to stitch existing virtual private networks (VPNs), such as MPLS based VPNs, with virtual private clouds (VPCs) in public cloud data centers. The stitching architecture can be realized by configuring a virtual routing application (VRA) in the VPCs and configuring virtual routing applications and a virtual routing application controller in the existing VPN. For VPCs in public clouds that do not have a VRA, traffic can be default routed to VPCs with a VRA.

20 Claims, 9 Drawing Sheets

Related U.S. Application Data

(60) Provisional application No. 62/632,669, filed on Feb. 20, 2018.

(51) Int. Cl.

| | | |
|---|---|---|
| *H04L 12/46* | (2006.01) | |
| *H04L 12/66* | (2006.01) | |
| *H04L 45/24* | (2022.01) | |
| *H04L 45/50* | (2022.01) | |
| *H04L 45/586* | (2022.01) | |
| *H04L 9/40* | (2022.01) | |
| *H04L 67/104* | (2022.01) | |
| *H04L 67/141* | (2022.01) | |
| *H04L 67/53* | (2022.01) | |

(52) U.S. Cl.
CPC .......... *H04L 12/4641* (2013.01); *H04L 12/66* (2013.01); *H04L 45/24* (2013.01); *H04L 45/50* (2013.01); *H04L 45/586* (2013.01); *H04L 63/029* (2013.01); *H04L 63/0272* (2013.01); *H04L 67/104* (2013.01); *H04L 67/141* (2013.01); *H04L 67/53* (2022.05); *G06F 2009/45595* (2013.01)

(58) Field of Classification Search
CPC ... H04L 45/50; H04L 45/586; H04L 63/0272; H04L 63/029; H04L 67/104; H04L 67/141; H04L 67/20; G06F 9/45558; G06F 2009/45595
See application file for complete search history.

(56) References Cited

U.S. PATENT DOCUMENTS

| | | | |
|---|---|---|---|
| 9,407,607 B2 | 8/2016 | Liu et al. | |
| 9,755,855 B2 | 9/2017 | Zhuang et al. | |
| 10,628,228 B1* | 4/2020 | Theunissen | H04L 43/0876 |
| 2005/0254440 A1* | 11/2005 | Sorrell | H04L 65/1101 |
| | | | 348/14.08 |
| 2006/0265511 A1* | 11/2006 | Riggs | H03M 7/30 |
| | | | 341/50 |
| 2010/0284308 A1* | 11/2010 | Lv | H04L 45/04 |
| | | | 370/254 |
| 2012/0054852 A1* | 3/2012 | Gibbs | H04W 12/03 |
| | | | 370/252 |
| 2013/0283364 A1 | 10/2013 | Chang et al. | |
| 2013/0346531 A1* | 12/2013 | Hummel | H04L 49/70 |
| | | | 370/254 |
| 2014/0047043 A1* | 2/2014 | Esfahani | G06Q 10/107 |
| | | | 709/206 |
| 2014/0098813 A1* | 4/2014 | Mishra | H04L 12/185 |
| | | | 370/390 |
| 2014/0123270 A1 | 5/2014 | Liu et al. | |
| 2014/0334495 A1* | 11/2014 | Stubberfield | H04L 49/354 |
| | | | 370/401 |
| 2015/0188888 A1 | 7/2015 | Kang et al. | |
| 2015/0310188 A1* | 10/2015 | Ford | G06F 21/10 |
| | | | 726/28 |
| 2016/0028632 A1 | 1/2016 | Vasseur et al. | |
| 2016/0344594 A1 | 11/2016 | Flavel et al. | |
| 2017/0006135 A1* | 1/2017 | Siebel | G06N 20/00 |
| 2017/0214545 A1 | 7/2017 | Cheng et al. | |
| 2017/0244607 A1* | 8/2017 | Dujodwala | H04L 41/147 |
| 2017/0264543 A1* | 9/2017 | Yuan | H04L 45/021 |
| 2019/0278928 A1* | 9/2019 | Rungta | G06F 9/5077 |
| 2019/0294477 A1* | 9/2019 | Koppes | G06F 9/5077 |
| 2020/0073739 A1* | 3/2020 | Rungta | G06F 8/60 |

FOREIGN PATENT DOCUMENTS

| | | |
|---|---|---|
| CN | 103634314 A | 3/2014 |
| CN | 104283755 A | 1/2015 |
| CN | 105721306 A | 6/2016 |
| CN | 106663034 A | 5/2017 |
| CN | 106992916 A | 7/2017 |
| CN | 106998284 A | 8/2017 |
| CN | 107580065 A | 1/2018 |

OTHER PUBLICATIONS

International Preliminary Report on Patentability dated Sep. 3, 2020, International Application No. PCT/US2019/018721.

* cited by examiner

STITCHING ENTERPRISE VIRTUAL PRIVATE NETWORKS (VPNS) WITH CLOUD VIRTUAL PRIVATE CLOUDS (VPCS)

PRIORITY CLAIM

This application is a continuation of PCT Patent Application No. PCT/US2019/018721, entitled, "Stitching Enterprise Virtual Private Networks (VPNs) with Cloud Virtual Private Clouds (VPCs)," filed Feb. 20, 2019 by Dunbar et al., which claims priority to U.S. Provisional Patent Application No. 62/632,669, entitled, "Methods in Stitching Enterprise Existing VPNs with Cloud VPCs," filed Feb. 20, 2018 by Dunbar et al., both of which are incorporated by reference herein in their entirety.

FIELD

The disclosure generally relates to stitching existing VPNs (e.g. MPLS based VPNs) with Virtual Private Clouds (VPCs) in third party Data Centers (a.k.a. Cloud DCs).

BACKGROUND

The benefits of the cloud-based applications and services are numerous, including fueling mobility and access to applications anytime, anywhere, and on any device, making collaboration more efficient and easier to manage.

With the advent of widely available third party cloud data centers in diverse geographic locations and the advancement of tools for monitoring and predicting application behaviors, it is technically feasible for enterprises to instantiate applications and workloads in locations that are geographically closest to their end users. This property aids in improving end-to-end latency and overall user experience. Conversely, an enterprise may wish to shutdown applications and workloads that are too far from their end users (therefore removing the networking connection to those deleted applications and workloads). In addition, an enterprise may wish to take advantage of more and more business applications offered by third party private cloud data centers, such as SAP HANA, Oracle Cloud, Salesforce Cloud, etc.

However, given the nature of how most Enterprise VPN networks are built, many of which are Multiprotocol Label Switching (MPLS) based, enterprises have to do some heavy lifting (e.g. upgrading their existing customer-provided equipment (CPEs), make new purchase agreement with data center providers, etc.) to utilize these cloud-based resources in a flexible and scalable manner.

BRIEF SUMMARY

This disclosure is directed toward to techniques for stitching existing VPNs with VPCs in public cloud DCs.

According to a first aspect of the present disclosure, a method of operating a network device to stitch an existing virtual private network (VPN) with one or more virtual private clouds (VPCs) in one or more public cloud data centers (DCs) includes communicating over the existing VPN between a plurality of first network devices; configuring a virtual routing application in a first VPC in a first public DC; and configuring one or more virtual routing application in the existing VPN. The method also includes establishing a plurality of paths between the first network devices in the existing VPN and one or more second networking devices in the first VPC, the plurality of paths including one or more physical connections and one or more virtual connections over non-secure networks. Additionally, a virtual routing application controller is configured in the existing VPN for controlling the virtual routing application in the first VPC and the one or more virtual routing applications in the existing VPN, whereby the virtual routing application controller routes the plurality of first network devices in the existing VPN to access applications instantiated in the first VPC through the paths between the first network devices and the first VPC.

Optionally, in a second aspect and in furtherance of the first aspect, the existing VPN is a multiprotocol label switching (MPLS) based VPN.

Optionally, in a third aspect and in furtherance of any of the preceding aspects, the one or more physical connections include a connection through a peer-to-peer file sharing hub.

Optionally, in a fourth aspect and in furtherance of any of the preceding aspects, the one or more virtual connections over non-secure networks include an Internet Protocol Security (IPsec) tunnel.

Optionally, in a fifth aspect and in furtherance of the preceding aspect, the IPsec tunnel terminates at a virtual gateway of the first VPC.

Optionally, in a sixth aspect and in furtherance of the fourth aspect, the IPsec tunnel terminates at one of the virtual routing applications in the first VPC.

Optionally, in a seventh aspect and in furtherance of any of the preceding aspects, the virtual routing application in the first VPC is housed in a virtual machine.

Optionally, in an eight aspect and in furtherance of any of the preceding aspects, the method further includes: establishing a plurality of additional paths between the first network devices in the existing VPN and one or more second networking devices in a second VPC in a second public DC, the plurality of additional paths including one or more physical connections and one or more virtual connections over non-secure networks; configuring a virtual routing application in the second VPC; and further configuring the routing application controller for controlling the virtual routing application in the second VPC, whereby the virtual routing application controller routes the plurality of first network devices in the existing VPN to access applications instantiated in the second VPC through the paths between the first network devices and the second VPC.

Optionally, in a ninth aspect and in furtherance of any of the preceding aspects, the method further includes further configuring the virtual routing application controller to route the first network devices to access applications instantiated in a second VPC by routing communications between the first network devices and the second VPC through the first VPC and through the paths between the first network devices in the existing VPN and the one or more second networking devices in the first VPC.

Optionally, in a tenth aspect and in furtherance of any of the preceding aspects, the method further includes monitoring by the virtual routing application in the first VPC of communications between one or more second VPCs and the plurality of first network devices.

According to another aspect of the present disclosure, a system for implementing a stitching an existing virtual private network (VPN) with one or more virtual private clouds (VPCs) in one or more public cloud data centers (DCs). The system includes first network device that includes a network interface configured to exchange communications with one or more networks; a memory configured to store data and instructions; and a processor coupled to the memory and the network interface. The processor is configured to execute instructions stored in the memory to configure the processor to: communicate over the existing VPN with one or more second network devices; establish a plurality of paths between the first network device and the second network devices in the existing VPN and one or more third networking devices in a first virtual private cloud (VPC) in a first public cloud data center (DC), the plurality of paths including one or more physical connections and one or more virtual connections over non-secure networks; and operate as a virtual routing application controller for controlling a virtual routing application in the first VPC and one or more virtual routing applications in the existing VPN, whereby the virtual routing application controller routes the plurality of first network device and the second network devices in the existing VPN to access applications instantiated in the first VPC through the paths between the first network devices and the first VPC.

Optionally, in a twelfth aspect and in furtherance of the preceding aspect, operating as the virtual routing application controller includes computing routing paths between the first VPC and the first and second network devices.

Optionally, in a thirteenth aspect and in furtherance of the preceding two aspects, the processor is further configured to execute instructions stored in the memory to configure the processor to: establish a plurality of additional paths between the first and second network devices in the existing VPN and one or more third networking devices in a second VPC in a second public DC, the plurality of additional paths including one or more physical connections and one or more virtual connections over non-secure networks; and further operate the routing application controller for controlling the virtual routing application in the second VPC, whereby the virtual routing application controller routes the plurality of first and second network devices in the existing VPN to access applications instantiated in the second VPC through the additional paths between the first and second network devices in the existing VPN and one or more third networking devices in the second VPC.

Optionally, in a fourteenth aspect and in furtherance of the preceding three aspects, the processor is further configured to execute instructions stored in the memory to configure the processor to further operate as the virtual routing application controller by routing communications between the first and second network devices and a second VPC through the first VPC and through the paths between the first and second network devices in the existing VPN and the one or more third networking devices to access applications instantiated in the second VPC.

Optionally, in a fifteenth aspect and in furtherance of the preceding four aspects, the processor is further configured to execute instructions stored in the memory to configure the processor to further operate as the virtual routing application controller to monitor in the first public cloud data center of communications between one or more second VPCs and the second network devices.

According to a further aspect of the present disclosure, a non-transitory computer-readable medium stores computer instructions for stitching an existing virtual private network (VPN) with one or more virtual private clouds (VPCs) in one or more public cloud data centers (DCs), that when executed by one or more processors, cause the one or more processors to perform a process that includes communicating over the existing VPN between a plurality of first network devices; configuring a virtual routing application in a first VPC in a first public DC; and configuring one or more virtual routing application in the existing VPN. The process also includes establishing a plurality of paths between the first network devices in the existing VPN and one or more second networking devices in the first VPC, the plurality of paths including one or more physical connections and one or more virtual connections over non-secure networks. Additionally, a virtual routing application controller is configured in the existing VPN for controlling the virtual routing application in the first VPC and the one or more virtual routing applications in the existing VPN, whereby the virtual routing application controller routes the plurality of first network devices in the existing VPN to access applications instantiated in the first VPC through the paths between the first network devices and the first VPC.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

The following presents techniques to integrate, or "stitch", existing virtual private networks (VPNs), such as MPLS (multiprotocol label switching) VPNs, with Virtual Private Clouds (VPCs) in third party Data Centers (a.k.a. Cloud DCs). Embodiments of a stitching architecture are realized by configuring a virtual routing application (VRA) in a VPC that belongs to a public cloud, such as in an Amazon Web Services (AWS) data center. For the VPCs in a public cloud that do not have a VRA, traffic from those VPCs can be default routed to the VPCs with a VRA. In some embodiments, the VRA can be hosted in a virtual machine (VM), a container. In other embodiments, the VRA can also be a software component residing in a virtual router (vRouter) or virtual switch (vSwitch). Each virtual overlay network can have a logically centralized VRA controller, which communicates with all VRAs for overlay network management and control.

A virtual private network extends a private network across a public network so that users are able to send and receive data across shared or public networks as if their computing devices were directly connected to the private network. This allows applications running across a VPN to benefit from the functionality, security, and management of the private network. VPN technology was developed to allow remote users and branch offices to access corporate applications and resources. To ensure security, the private network connection is established using an encrypted layered tunneling protocol and VPN users use authentication methods, including passwords or certificates, to gain access to the VPN. A VPN is created by establishing a virtual point-to-point connection through the use of dedicated connections, virtual tunneling protocols, or traffic encryption. A VPN available from the public Internet can provide some of the benefits of a wide area network (WAN). From a user perspective, the resources available within the private network can be accessed remotely.

When implemented as a Multiprotocol Label Switching (MPLS) virtual private network, VPN members at different locations are connected through an MPLS backbone network, for example, a first VPN member and a second VPN member are connected, where the first VPN member and the second VPN member are connected to a same VPN through an MPLS backbone network. The first VPN member is connected to a first provider edge (Provider Edge, PE for short) device of the MPLS backbone network by using a first customer edge 15 (Customer Edge, CE for short) device, the first PE device 17 is connected to a second PE device 17 through the MPLS backbone network, and the second PE device is connected to the second VPN member by using a second CE 15. The first VPN member and the second VPN member may perform communication through a path that is formed by the first CE 15, the first PE 17, the MPLS backbone network, the second PE 17, and the second CE 15.

Figure 1:
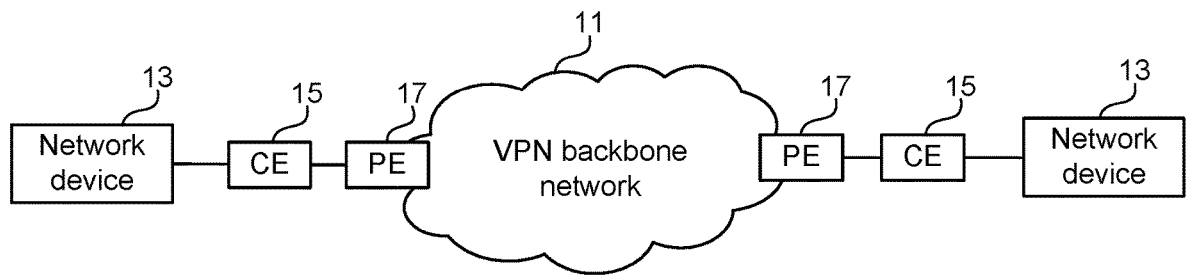
FIG. 1 is an architecture diagram illustrating in an embodiment of a VPN implementation.

FIG. 1 is an architecture diagram illustrating in an embodiment of a VPN implementation, which can serve as an example of an existing VPN that can be stitched with one or more virtual private clouds in one or more public cloud data centers. As shown in FIG. 1, the system is a network architecture of an MPLS VPN, and the MPLS VPN includes an MPLS backbone network 11 and multiple VPN members, or network devices 13. The network devices 13 at different locations are connected through the MPLS backbone network 11; moreover, the multiple VPN member network devices 13 may belong to a same VPN. For example, two VPN members network devices 13 exemplified in FIG. 1 are connected through the MPLS backbone network 11 and belong to the VPN. Two PE devices are disposed at edges of the MPLS backbone network 11, where the PE devices are configured to connect VPN members. For example, as shown in FIG. 1, a VPN member network device 13 at one end of the MPLS backbone network is connected to a PE device by using a CE, and connected to a VPN member network device 13 at the other end of the MPLS backbone network through connection to the MPLS backbone network by using a PE device. It should be noted that the number of VPN members, the number of PE devices, and the like in an MPLS VPN are not limited to two, and the two are shown in FIG. 1 is only used as an example.

Figure 2:
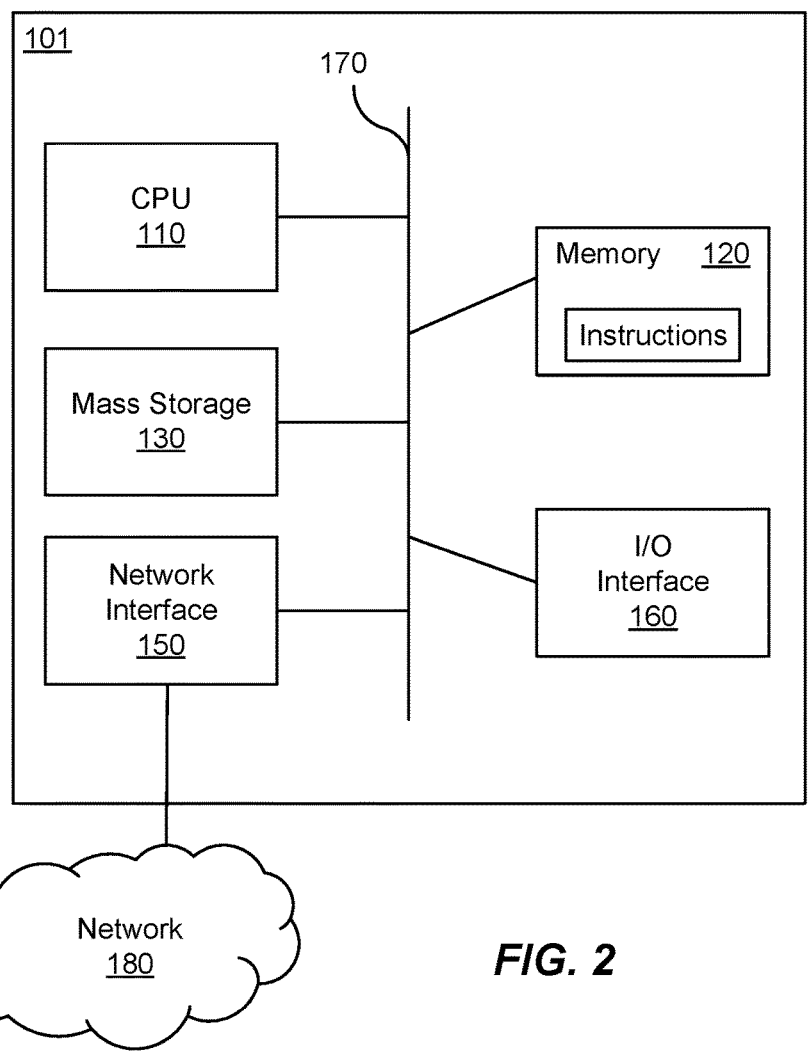
FIG. 2 is a block diagram of a network device that can be used to implement various embodiments.

FIG. 2 is a block diagram of a network device, such as a VPN member of FIG. 1, that can be used to implement various embodiments. Specific network devices may utilize all of the components shown, or only a subset of the components, and levels of integration may vary from device to device. Furthermore, the network device may contain multiple instances of a component, such as multiple processing units, processors, memories, transmitters, receivers, etc. The network device may comprise a processing unit 101 equipped with one or more input/output devices, such as network interfaces, storage interfaces, and the like. The processing unit 101 may include a central processing unit (CPU) 110, a memory 120, a mass storage device 130, and an I/O interface 160 connected to a bus 170. The bus 170 may be one or more of any type of several bus architectures including a memory bus or memory controller, a peripheral bus or the like.

The CPU 110 may comprise any type of electronic data processor. The memory 120 may comprise any type of system memory such as static random access memory (SRAM), dynamic random access memory (DRAM), synchronous DRAM (SDRAM), read-only memory (ROM), a combination thereof, or the like. In an embodiment, the memory 120 may include ROM for use at boot-up, and DRAM for program and data storage for use while executing programs. For example, the memory 120 can store instruction by which the processor CPU 110 can be used to configure the network device to perform the methods described in the following for stitching existing VPNs into virtual private clouds. The mass storage device 130 may comprise any type of storage device configured to store data, programs, and other information and to make the data, programs, and other information accessible via the bus 170. The mass storage device 130 may comprise, for example, one or more of a solid state drive, hard disk drive, a magnetic disk drive, an optical disk drive, or the like.

The processing unit 101 of a network device also includes one or more network interfaces 150, which may comprise wired links, such as an Ethernet cable or the like, and/or wireless links to access nodes or one or more networks 180. The network interface 150 allows the processing unit 101 to communicate with remote units via the networks 180. For example, the network interface 150 may provide wireless communication via one or more transmitters/transmit antennas and one or more receivers/receive antennas. In an embodiment, the processing unit 101 is coupled to a local-area network or a wide-area network for data processing and communications with remote devices, such as other processing units, the Internet, remote storage facilities, or the like. Of particular relevance in the following discussion, the network interface can be used to attach to VPNs and also to virtual private clouds, such as through a secure tunnel or by a physical connection (such as a Direct Connect mechanism).

The components depicted in FIG. 2 may be implemented in software, in hardware, or combinations thereof. In some embodiments, the software may be stored in memory 120 (e.g., a non-transitory computer-readable medium), on a memory device, or some other physical memory and may be executed by one or more processing units (e.g., one or more processors, one or more processor cores, one or more GPUs, etc.).

A virtual private cloud (VPC) is an on-demand configurable pool of shared computing resources allocated within a public cloud environment, providing a certain level of isolation between the different organizations using the resources. The isolation between one VPC user and other users of the same cloud is normally achieved through allocation of a private IP subnet and a virtual communication construct (such as a virtual local area network, VLAN, or a set of encrypted communication channels) for each user. In a VPC mechanism providing isolation within the cloud is accompanied with a VPN function for each VPC user that secures the remote access of the organization to its VPC cloud resources. With these isolation levels, an organization using this service is in effect working on a cloud infrastructure is not shared with other users.

A VPC is commonly used in the context of cloud infrastructure as a service. In this context, the infrastructure provider, providing the underlying public cloud infrastructure, and the provider realizing the VPC service over this infrastructure, may be different vendors. An example is Amazon Web Services, or AWS.

One approach for implementing secure connectivity between a VPC and a network device is through use of a secure tunnel, such as an Internet Protocol Security, or IPsec, tunnel. In a secure tunnel mode, the entire IP packet can be encrypted and authenticated. It is then encapsulated into a new IP packet with a new IP header. Tunnel mode is used to implement a virtual private networks for network-to-network communications (e.g., between routers to link sites), host-to-network communications (e.g. remote user access) and host-to-host communications.

Figure 3:
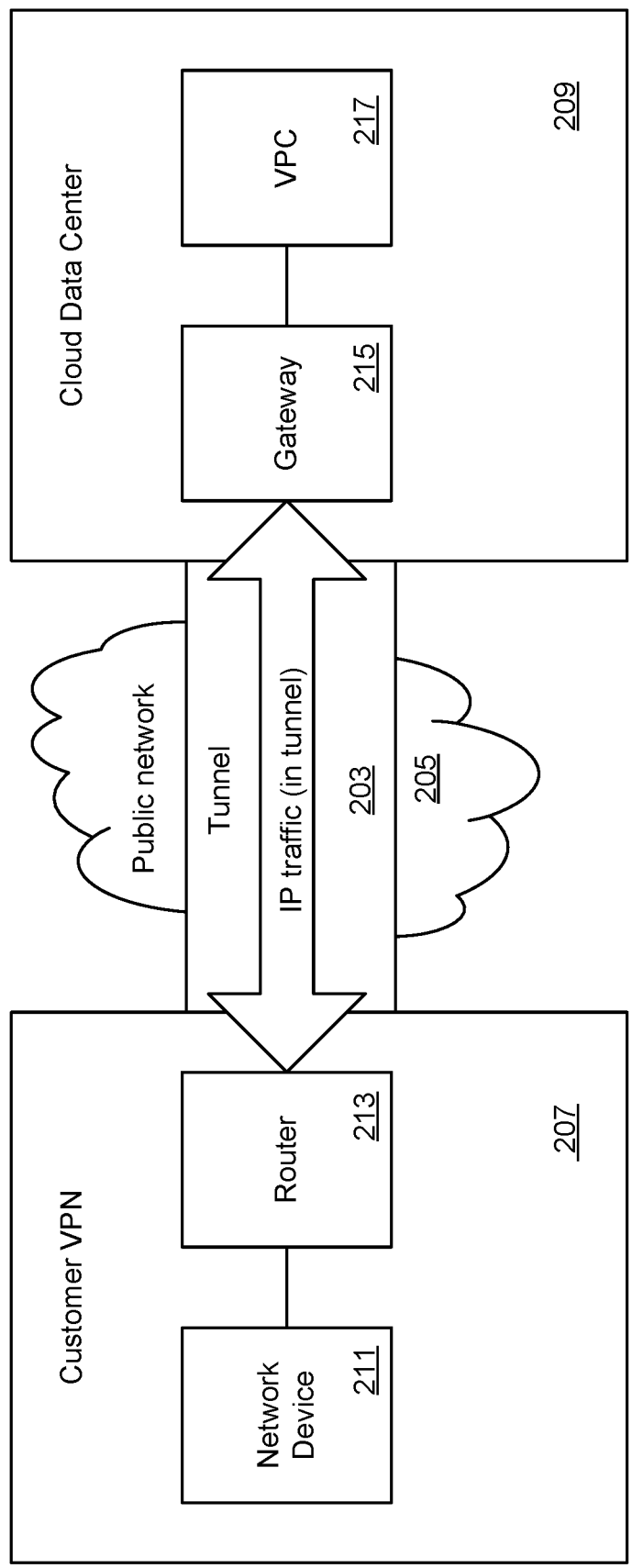
FIG. 3 illustrates the use of a secure tunnel to connect a network device of a VPN to a VPC.

FIG. 3 illustrates the use of a secure tunnel to connect a network device of a VPN to a VPC. To the left of FIG. 3 is a customer VPN 207 that includes a network device 211. For example, the customer VPN 207 can correspond to the VPN of FIG. 1, where network device 211 is one of the network devices 13. Although only a single network device 211 is shown in FIG. 3, it will be understood that a typical embodiment can often have many more such network devices as part of the customer VPN 207. A router 213 can be used to connect a network device 211 from the customer VPN 207 to a cloud data center 209 though a public network 205.

The network device 211 can establish a secure tunnel 203 over the public network 205 to a gateway 215 of the cloud data center 209. IP packets can be encrypted and authenticated, then encapsulated into a new IP packet with a new IP header and transmitted through the tunnel between the network device 211 in VPN 207 and the VPC 217 of the cloud data center 209.

One approach for the customer premise equipment (CPE) connected through an enterprise's VPN to reach workload or applications instantiated in public cloud data centers is by using tunnels, such IPsec tunnels, or SD-WAN (software-defined networking in a wide area network) to connect enterprise's CPEs to a public cloud's gateway, such as either AWS Virtual Gateway or internet Gateway in the example of an AWS: However, under previous arrangements, this involved establishing an individual secure communication tunnel between each set of customer premise equipment and each public data center, a situation illustrated in FIG. 4.

Figure 4:
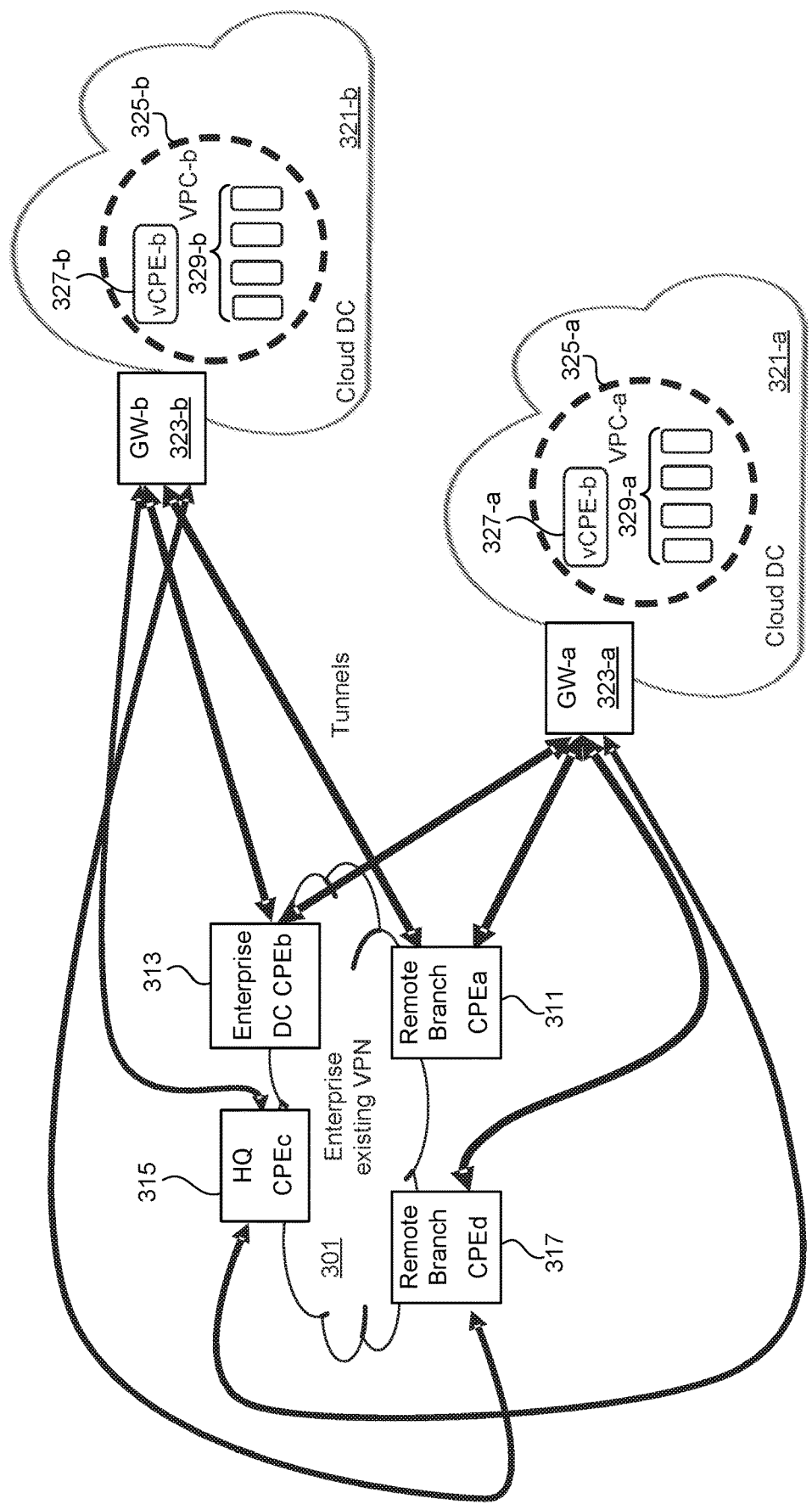
FIG. 4 is a schematic representation of a prior art arrangement of a data center interconnect of a VPN through IPsec tunnels.

FIG. 4 is a schematic representation of a prior art arrangement of a data center interconnect of a VPN through IPsec tunnels. A customer's existing enterprise VPN 301 connects a number of different locations, each with customer-provided equipment, including one or more networking devices. In this example, this include a headquarters 315 with CPEc, an enterprise data center 313 with CPEb, a first remote branch office 311 with CPEa, and a second remote branch 317 with CPEd, but other examples can more of fewer locations. A first VPC VPC-a 325-a is located in a first cloud data center 321-a and includes virtual customer-provided equipment vCPE-a 327-a, with a number of applications 329-a instantiated. The example of FIG. 4 also includes a second VPC VPC-b 325-b located in a second cloud data center 321-b and includes virtual customer-provided equipment vCPE-b 327-b, with a number of applications 329-b instantiated. Other examples will have more or fewer public cloud data centers and VPCs within a data center.

Each of cloud data centers 321-a and 321-b has a respective gateway GW-a 323-a and GW-b 323-b. The gateways GW-a 323-a and GW-b 323-b can perform network address translation (NAT), remapping one IP address space into another by modifying network address information in the IP header of received packets. As illustrated in FIG. 4, in previous arrangements the CPE in each of the locations connected to the enterprise's existing VPN 301 will have to individually establish a secure communication tunnel to each of the cloud data center gateways.

Figure 5:
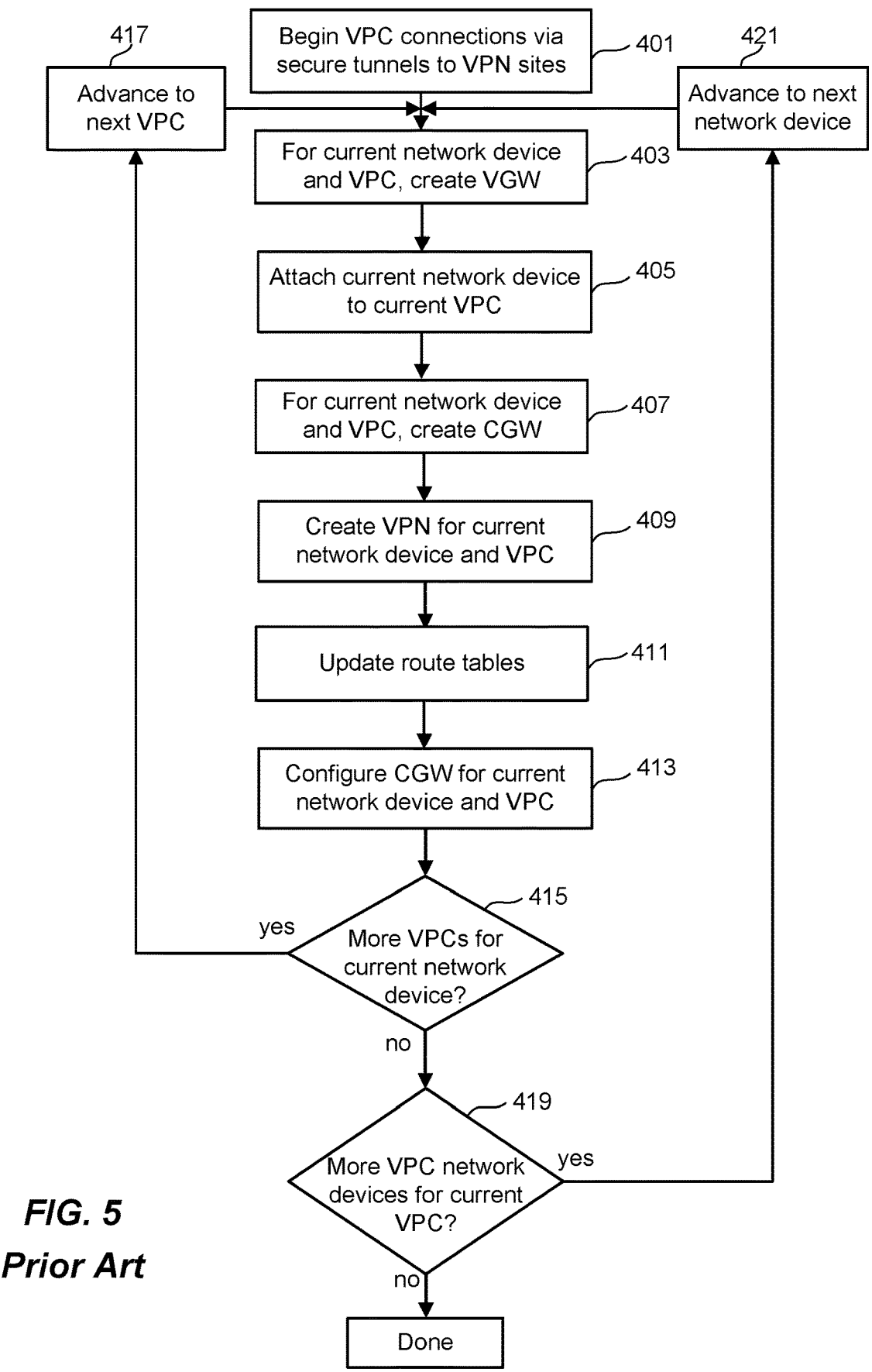
FIG. 5 is a flowchart illustrating one example of a prior art arrangement for establishing the connection of VPCs via IPsec tunnels to the customer sites of an existing VPN as illustrated in FIG. 4.

FIG. 5 is a flowchart illustrating one example of a prior art arrangement for establishing the connection of VPCs via IPsec tunnels to the customer sites of an existing VPN as illustrated in FIG. 4. The process of establishing the VPC connections though the secure communication tunnels to the VPN begins at 401 and is performed individually for each network device of the VPN and each VPC. For the first network device and first VPC, a virtual gateway (VGW) is created at 403 and the network device is attached to the VPC at 405. At 407, a corresponding customer gateway (CGW) is created, followed by creating a VPN for the current network device and VPC at 409, and the updating of route tables to account for this at 411. The customer gateway can then be configured at 413 to reflect updated routing.

The process of 403-413 arranges the connection for just a first network device and a first VPC, and the process will be repeated for other network device, VPC pairs. In the example of FIG. 5, the connections of the current network device to other VPCs is performed first, followed by moving on to the connection of other network devices to VPCs, but the network device-VPC pair connections can be made in other orders.

In the example of FIG. 5, 415 determines whether the current network device is to be connected to more VPCs and, if so, after advancing to the next VPC at 417 the flow loops back to 403 to make the connections for VPC selected at 417. If all of the VPC connections for the current networking device have been established, the flow goes from 415 to 419 where, if there are more network devices to connect to VPCs, after advancing to the next network device at 421, the flow loops back to 403 to repeat 403-417 for each additional network device and its VPC connections. The process continues until the connections for all of the network device-VPC pairing are completed.

One of the shortcomings of the approach described with respect to FIGS. 4 and 5 is the complexity of the multi-point any-to-any interconnections, such as represented with respect to the tunnels of FIG. 4. The dynamic workload instantiated in a cloud DC, such as 329-a in 321-a or 329-b in 321-b, needs to communicate with multiple branch offices (e.g., 311, 317) and on premise data centers (313). Most enterprises need multi-point interconnection among multiple locations, as done by MPLS Layer 2/Layer 3 VPNs. Using SD-WAN overlay paths to achieve any-to-any mesh interconnection among all branches not only requires all branches' CPEs to support SD-WAN, but also require the CPEs to manage routing among other CPEs located at other locations (such as VPC-a 325-a in cloud DC 321-a and VPC-b 325-b in cloud DC 321-b), which can increase the complexity of the CPEs when compared to MPLS-based VPN solutions.

The architecture of FIG. 4 also exhibits poor performance over long distance. When CPEs are far apart from each other or across particular boundaries, whether political (e.g. country boundary) or related to Internet topology, performance over the public Internet can be problematic and unpredictable. Even though there are many monitoring tools available to measure delay and various performance characteristics of the network, the measurement for paths over the Internet is passive and past measurements may not represent future performance. Therefore, performance can be problematic for CPEs in different geographic locations to reach applications in a cloud DC over the Internet (such as by SD-WAN). If a cloud provider can replicate workload in different available zones (geographically closer to the users), the replications in different cloud physical locations will need extra coordination, which is not trivial.

There are also scaling issues associated the multiple secure communication tunnels of the architecture of FIG. 4. IPsec can achieve secure overlay connections between two locations over any underlay network, e.g. between CPE and a cloud DC gateway such as GW-a 323-a or GW-b 323-b. For a simple SD-WAN overlay between a small number of fixed branch offices, each CPE only needs to terminate a very small number of IPsec tunnels, which will be for the most part static in nature. However, for multiple branches to reach workloads such as the applications 329-a, 329-b instantiated hosted in cloud DCs 321-a, 321-b, the SD-WAN solution requires a cloud DC gateway to maintain individual IPsec tunnels between the cloud DC gateway and each individual branch office. For a company with hundreds or thousands of locations, there could be hundreds (or even thousands) of IPsec tunnels terminating at the Cloud DC gateway, which can be very processing intensive for the gateway. Many routers today have limited capacity to support a large number of IPsec tunnels.

The arrangement of FIG. 4 can also have end-to-end security concerns for data flows. When IPsec tunnels from enterprise on-premise CPEs such as 311, 313, 315 or 317 are terminated at the cloud DC gateway such as GW-a 323-a, GW-b 323-b where the workloads or applications 329-a, 329-b are hosted, some enterprises have concerns regarding traffic to/from their workload being exposed to others behind the data center gateway (e.g., exposed to other organizations that have workloads in the same data center). To ensure that traffic to/from workloads is not exposed to unwanted entities, the IPsec tunnels should go all the way to the workload (such as servers, or Virtual Machines (VMs)) within the DC.

Consequently, with the method illustrated with respect to FIGS. 4 and 5, an enterprise (at the corporate level) has to manage the connections itself, including upgrading their CPEs to be able to establish all of the IPsec tunnels to the cloud DC gateways (e.g., AWS' VGW-virtual Gateway). When an enterprise has many sites, many IPSec tunnel termination points have to be purchased from the cloud data centers, which is costly, in addition to upgrading its CPEs.

Additionally, the approach illustrated with respect to FIGS. 4 and 5 does not scale well, especially when there many branches to be connected to VPCs. In addition, there is no direct data path among VPCs and VPNs.

The following presents a secure and scalable approach that can seamlessly incorporate, or stitch, the existing VPN that interconnect enterprises' branches and on premise data centers with the virtual networks in hybrid Cloud DCs without the need to upgrade CPEs at the branch sites and on premise data center sites. Among other aspects, embodiments presented here allow for the seamless connection of cloud based application and workloads (i.e. those that are instantiated in third party data centers which also host services for other customers) with a customer's on premise data centers or branch offices over multiple paths for connectivity, where some of the paths can be physical connections and some can be virtual connections over third party non-secure networks, without needing to upgrade enterprise existing CPEs. A virtual routing application, or VRA, can be used to remotely probe a third party cloud DC for extended monitoring and control via working with hardware based devices outside the cloud DC. Additionally, intelligent tunnels can be established among different cloud DCs for optimal routing.

Figure 6A:
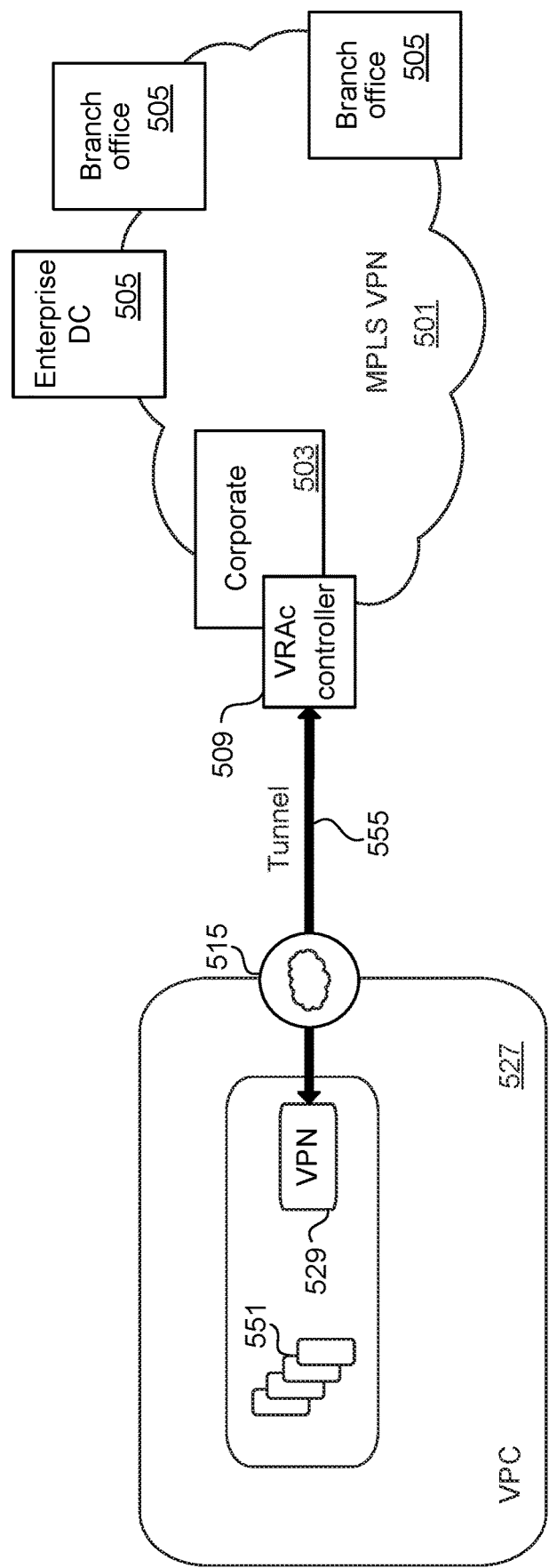
FIGS. 6A and 6B illustrate the use of a virtual routing application to establish a VPN within a public cloud data center, where FIG. 6B provides a more detailed version of FIG. 6A.
Figure 6B:
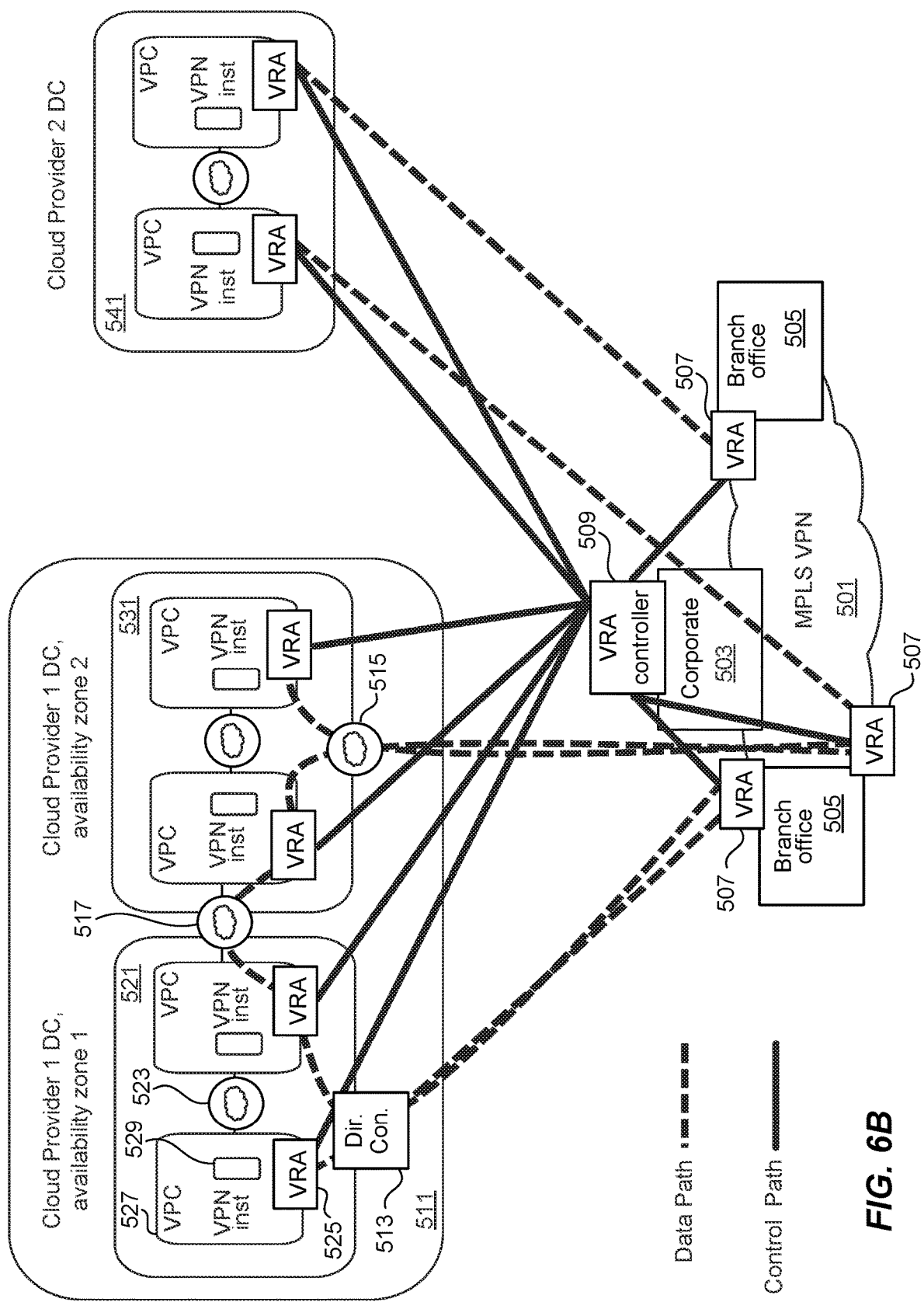

FIGS. 6A and 6B illustrate the use of a virtual routing application to establish a VPN within a public cloud data center, where FIG. 6B provides a more detailed version of FIG. 6A.

In the simplified representation of FIG. 6A, a number CPEs are connected over a customer's existing VPN 501, which can include a number of branch offices and enterprise data center, all here labelled 505, and a corporate location 503. The various CPEs 503 and 505 of FIG. 6A can be connected over the VPN 501 as described above with respect to the CPEs 311-317 connected over VPN 301 of FIG. 4. Now, however, the CPEs 505 of FIG. 6A incorporate a virtual routing application, or VRA, and the corporate location 503 or other VPN CPE incorporates a VRA controller 509.

A VPC 527 in a public cloud data center incorporates a software implemented VPN 529, where a number of applications 551 instantiated on the VPC. The existing MPLS VPN 501 can be connected to the VPN 529 of VPC 527 through an internet gateway 515 by use of a second communication tunnel 555. Unlike the arrangement of FIG. 4, where each CPE 521-527 is connected by an individual tunnel 555 to the gateway of a cloud data center, now, by use of the VRA controller 509 a single tunnel 555 allows the CPE 503, 505 on the existing VPN 501 to connect to the VPN 529 in the VPC 527. As illustrated in the more detailed FIG. 6B, the secure communication tunnel 555 over a public cloud can terminate at a virtual gateway of the public cloud data center or at a VRA in the public cloud data center, while other connections can also include a physical connection without encryption such as by use of a protocol such as Direct Connect.

In the example of FIG. 6A, it is no longer necessary to depend on a cloud provider's virtual gateway (e.g., AWS' vGW) to establish IPsec tunnels with a customer gateway; that is, it is not necessary to attach the VPCs with vGW, bypassing any throughput limitations of an IPsec tunnel. This allows the bypass the limitation of the cloud provider's virtual gateway.

Embodiments of the stitching architecture can be realized by placing, or configuring, a virtual routing application (VRA) in the VPC that belongs to a public cloud. For the VPCs in public clouds that do not have a VRA, traffic from those VPCs can be default routed to the VPCs with a VRA. The VRA within a VPC can be hosted in a virtual machine (VM). In other embodiments, it can also be a component residing in a virtual router (vRouter) or a virtual switch (vSwitch).

Each virtual overlay network can have a logically centralized VRA controller 509, which communicates with all VRAs for overlay network management and control. The stitching procedure can include a VRA registration that can include VPC information and a VPC and VPN map. The VRA controller can manage path computing and path setup for traffic among VPCs and MPLS VPN sites. This can be illustrated with reference to FIG. 6B.

FIG. 6B is a more detail representation of an embodiment for an architecture to stitch corporate VPNs with VPCs in public cloud DCs, such as AWS (via DirectConnect or Internet Connection (SD-WAN)), Azure, Huawei-Cloud, or other cloud DCs. A number of instances of customer premise equipment at various locations are connected through the customer's existing MPLS VPN 501, where in the example two branch offices 505 and a corporate office 503 are shown, where there will typically be more, often many more, remote locations and enterprise data centers connected over VPN. Unlike the arrangement of FIG. 4, a VRA 507 is configured on the CPEs such as network devices in the branch offices 505. A VRA controller operated by one of the network devices, here at the corporate location 503.

The example of FIG. 6B presents an embodiment with a first public cloud data center 511, with two availability zones 521 and 531, and a second cloud data center 541. Each availability zone of cloud provider 1 DC and cloud provider 2 DC has two VPCs (labelled 527 in the left-most example) each with an active VPN instance (labelled 529 for the left-most example). Different embodiments can have differing numbers of cloud provider DCs with differing numbers of VPCs, but example of FIG. 6B is provided for illustrative purposes. The different VPCs within each cloud provider and the different availability zones within a given cloud provider can be connected via VPC peering, as represented at 523 and 517. To take specific examples, the cloud provider data center 511 could be an AWS data center and the cloud provider data center 541 could be a Huawei-cloud data center. In the example of FIG. 6B, the availability zone 521 has a path to VPN 501 using a physical connection without encryption such as by use of a protocol such as Direct Connect, the availability zone 531 is connected over a public cloud by way of a secure communication tunnel terminating at a virtual gateway 515 of the public cloud data center, and cloud provider 2 DC 541 is connected over a public cloud by way of a secure communication tunnel terminating at a VRA.

Within each VPC in each public cloud data center, a VRA is established. The VRAs established within the VPCs in the public cloud data centers and within the network devices connected to the MPLS VPN 501 are controlled by the VRA controller 509. The VRA controller 509 handles the VPC peering across clouds, such as key distribution, where the control path from the VRA controller 509 to each VRA 507 is represented by the solid heavy lines.

Data paths in FIG. 6B are represented by the broken heavy lines from the VRAs 507 on the MPLS VPN 501 to the VRAs 525 on the public cloud data centers. In the example of the left-most data path, the VRA 507 of MPLS 501 is connected to the VRAs 525 of public cloud provide 1 data center, availability zone 1 521 by way of a collocated central hub 513 using a protocol such as Direct Connect. The VRAs 525 of public cloud provide 1 data center, availability zone 2 531 are connected to a VRA 507 of MPLS 501 via an internet gateway 515, such as when direct connection is not available. A data path can also flow between VRAs of the cloud provide 1 data centers 521 and 531 by way of VPC peering, as represented at 517. The data paths between the VPN instances 529 in the VPCs and the VRAs in the MPLS VPN 501 can use their own encryption.

For regions without Direct Connect, such as 531 of FIG. 6B, the VRA controller 509 can use an internet gate 515, such as AWS Internet Gateway, to establish SD-WAN with the VRA 507 in the MPLS VPN 507. The VRA controller 509 can assign an Elastic IP to each VRA 507. For each VPC the VRA controller can create a customer Route table for the VPC, making default routes to each of the VRAs 507 (instead of virtual gateway (vGA) or internet gateway (iGA) of AWS VPC). The VRA controller 509 can make the subnet assigned to a VRA 507 to be a public subnet by adding a route to an Internet gateway, where, to do this VRA controller 509 can create and attach an Internet gateway to a VPC, and then add a route with a destination of 0.0.0.0/0 for IPv4 (fourth version of the Internet Protocol) traffic or ::/0 for IPv6 (Internet Protocol, version 6). For regions with Direct Connect, such as 521, a VRA 507 can be connected with the customer gateway directly as illustrated at 513.

Figure 7:
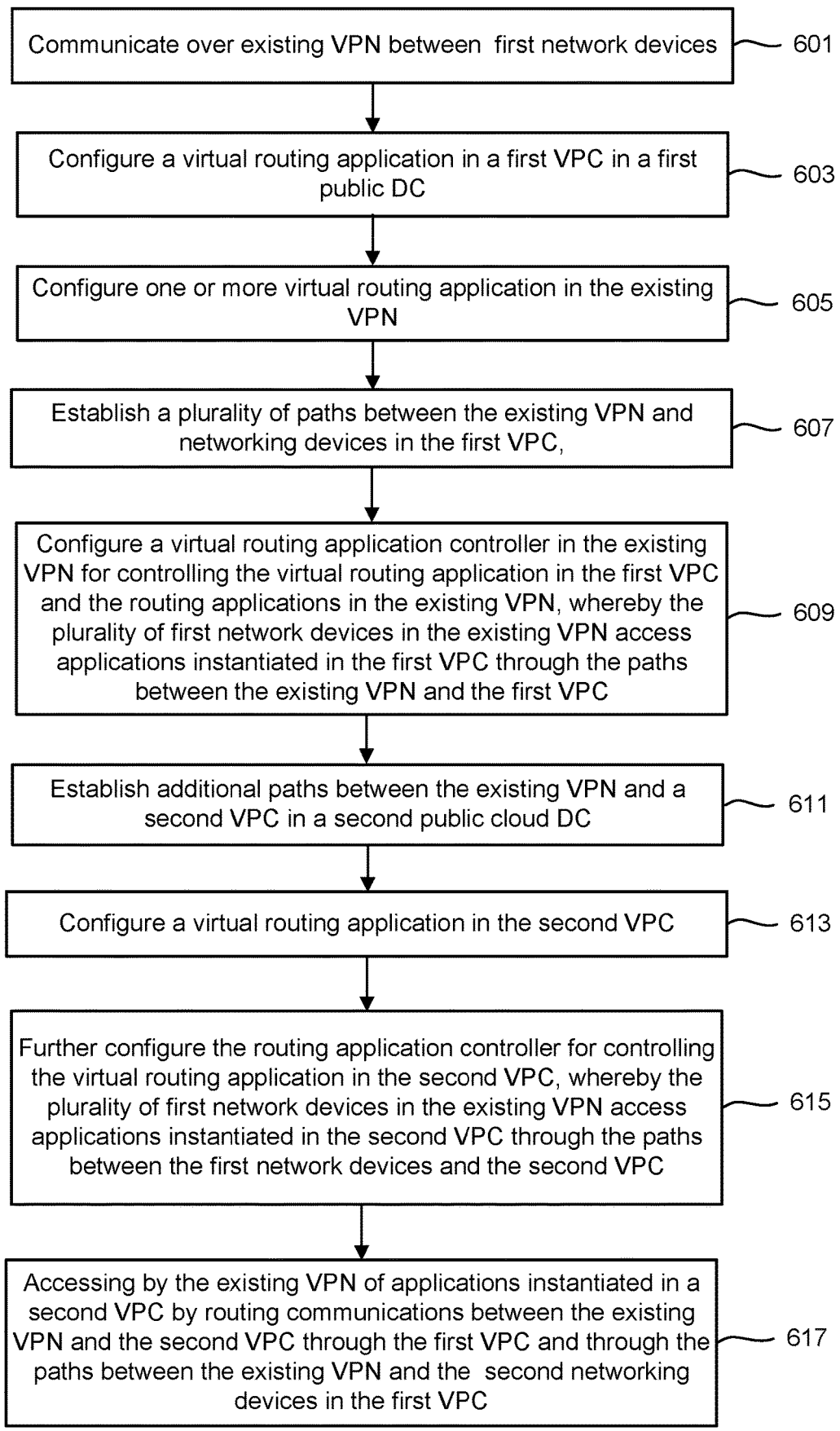
FIG. 7 is a flow diagram to illustrate embodiments of implementing a virtual private network and stitching the VPN with cloud VPCs.

FIG. 7 is a flow diagram to illustrate embodiments of stitching an existing virtual private network with one or more virtual private clouds in one or more public cloud data centers. Starting with 601 and an existing VPN 501, the various network devices including a network device 503 at (in this example) the corporate location communicate over the existing VPN with other network devices, such as the branch offices 505. The VRAs 525 can be configured in the public cloud data centers at 603 and the VRAs 507 in the existing VPN 501 can be configured vat 605.

At 607, the paths between the first network devices in the existing VPN and one or more second networking devices in the first VPC are established, the paths including one or more physical connections and one or more virtual connections over non-secure networks. In the embodiment of FIG. 6B, an example of physical connections is the example of the availability zone 521 that has a path to VPN 501 using a physical connection without encryption such as by use of a protocol such as Direct Connect. Examples of virtual connections over non-secure networks are illustrated with respect to the availability zone 531, which is connected over a public cloud by way of a secure communication tunnel terminating at a virtual gateway 515 of the public cloud data center, and cloud provider 2 DC 541, which is connected over a public cloud by way of a secure communication tunnel terminating at a VRA. Although shown in the order of 603, 605, 607 in FIG. 7, these can be performed in differing orders, such as performing 607 before 603 and 605 or currently with 605, for example.

At 609, the VRA controller 509 is configured to act as a controller for the for VRAs 507 the MPLS VPN 501 and for the VRAs 525 in the cloud DCs. The network devices of the exiting VPN 501 can then access the application 529 initiated on the cloud 527 by way of paths established at 603.

Similarly, for one or more second VPCs in second public cloud DCs, a corresponding one or more additional paths can be established by the VRA controller 509 at 611. As in 603, for the second public cloud DCs, VRAs can be configured for accessing the second VPN instances in the second VPCs, such as in the cloud provider data bases 531 and 541, at 613. At 615 the VRA controller 509 can be operated as a controller for the network devices of the existing VPN 501 to access applications initiated in the second VPCs through the corresponding second secure communication tunnel as established at 611.

At 617, the network devices of the existing VPN 501, such at the branch offices 505, can access applications initiated in a second VPC by routing by the VRA controller 509 of communications between the second network devices 505 and the second VPC through another, first VPC by way of a corresponding first tunnel, such as established at 603. For example, the data path from left-most VRA 507 can access network device applications initiated in one VPC, such as the left of cloud provider 1 DC 531 at availability zone 2, by way of the direction connection hub 513, to the VRA of the right-side VPC of cloud provided DC 521 by way of the cloud peering connection illustrated at 517 between 521 and 531.

Figure 8:
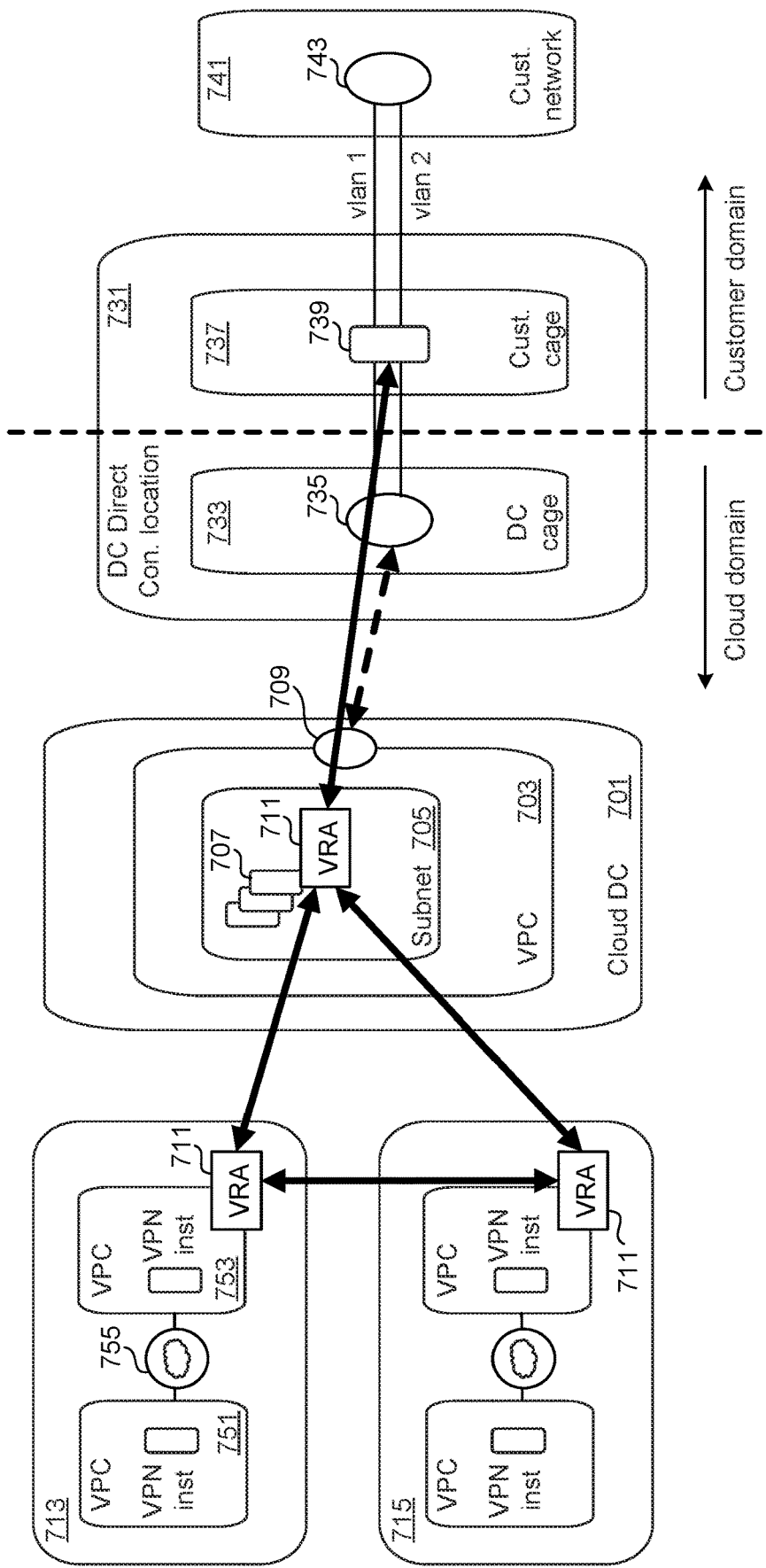
FIG. 8 illustrates the use of the VRA as a remoted probe in the cloud data centers for extended monitoring and control of the stitched existing VPN and VPCs.

FIG. 8 illustrates an embodiment of the use of the VRA as a remoted probe in the cloud data centers for extended monitoring and control of the stitched existing VPN and VPCs. In the example of FIG. 8, the customer's network 741 is connected to a cloud data center 701 by way of a DC direct connect hub location 731. The DC direct connect location 731 straddles the cloud domain, including the cloud DC 701, and the customer domain, including the customer network 741. The customer network 741 can correspond to the MPLS VPN 501 of FIGS. 6A and 6B, but, to simplify the representation, is only explicitly shown to include a customer router/firewall 743 that is connected to the DC direct connection location 731 over, in this example, a pair of virtual local area networks vlan1 and vlan2.

The embodiment for the cloud domain of this example includes a cloud data center 701 with a VPC 703 having a virtual private gateway 709 and including a first subnet 705. A VRA 711 is installed in the subnet 705 with a number of application instances 707. Also, in the cloud domain are additional cloud data centers 713 and 715, each of which can have a number of VPCs (two are shown in this example) with a VPN instance and that can be connected via VPC peering. For example, cloud data center 713 includes VPC 751 and VPC 753, which are connected via VPC peering at 755. A VPC within each of the cloud data centers 713 and 715 has a VRA 711 installed.

Within the cloud domain the DC direct connect location 731 is a data center cage 733 that can include a data center direct connect end point 735 that can exchange control signals with the virtual private gateway 709 as illustrated by the broken line arrow. Within the customer domain is a customer or partner cage 737 that can include a customer or partner router 739, which can include hardware based sophisticated telemetry capabilities. The pair of virtual local area networks vlan1 and vlan2 extend across the customer router 739 to the direct connect endpoint 735.

The solid heavy arrows represent customer connections as managed by the VRA controller 509. From the customer router 739, the connectivity link is connected to the VRA 711 of the subnet 711 as described with respect to FIGS. 6A and 6B. VRA 711 of VPC 703 can connect to VRAs 711 of cloud DCs 713 and 715, which can also connect to one another, to monitor and control the communications amongst the cloud DCs. In some embodiments, the VRAs 711 of cloud DCs 713 and 715 can perform simple collection, sending to the closure point on a fixed schedule.

Figure 9:
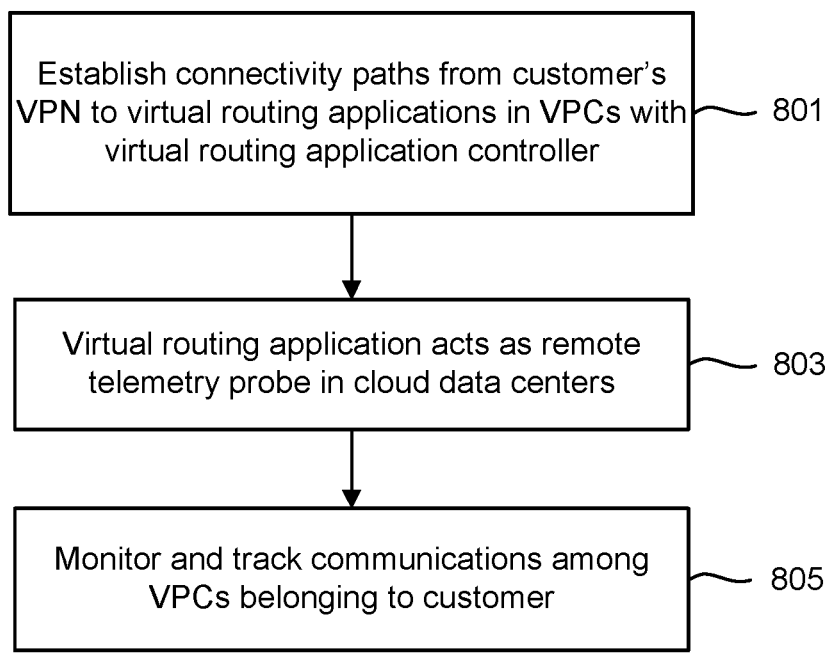
FIG. 9 is a flow diagram to illustrate embodiments of using the VRA as a remote probe in the cloud DCs for extended monitoring and control.

FIG. 9 is a flow diagram to illustrate embodiments of using the VRA as a remote probe in the cloud DCs for extended monitoring and control. At 801, the virtual routing application controller establishes a path for connectivity from a customer's VPN to the VPCs, where FIG. 7 provides additional detail. The virtual routing application acts as a remote telemetry probe in cloud data centers at 803. At 805, the VRA controller of a customer monitors and tracks communications among the VPCs belonging to the customer.

The VRA of the embodiments that have been presented here can perform a number of functions. For example, registration of the VRAs with the VRA controller can include a VRA elastic IP, a VRA actual assigned IP, a time stamp, a tunnel ID (for establishing IPsec and GRE (general routing encapsulation) group tunnels with other VRAs). The VPC structure can include, for example, name, vlan, virtual interface, border gateway protocol (BGP), cloud provider ID, type, and/or other information, and register with the VRA controller. The VRA registration with the VRA controller can include reachable hosts and subnets within the same region by locally assigned route tables in AWS case, as AWS does not support layer 2 broadcast (i.e. address resolution protocol (ARP) or neighbor delivery (ND) protocol), and an emulated layer 2 ARP (IPv4)/ND (IPv6) scan to discover all the actively attached hosts and subnets within the same region.

In other VRA functions, instead of discovering remote VRAs by a regular PING, remote VRAs can use a Virtual PING request with the VRA controller by region name, because remote VRAs might not be active all the time. By use of inter-region transparent peering (such as illustrated at 517 in FIG. 6B), the VRA allows VPC peering across zone and cloud provider, and elastic and efficient routing controlled by the overlay owner. The VRA controller can establish IPsec tunnels with VRAs in other regions, with keys distributed by the VRA controller. As instances are charged over time (by minutes/hours), VRAs in each zone can become active when there is workload initiated in the availability zone.

The remote telemetry probe function performed by the VRA illustrated with respect to FIG. 8 allows the VRA to monitor and keep track of communications among VPCs belonging to a specific customer (virtual networks), where this can include meta-data such as: VPC ID (to and from); traffic volume (to and from); and time stamp. Additional monitoring can also be performed as instructed by the VRA controller.

As described above, among the features of the embodiments presented here include a new virtual routing application VRA to stitch VPCs or virtual networks in a public cloud with existing VPNs (e.g., an MPLS Based VPN). Additionally, an extended VRA to VRA controller registration can be used, with cloud DC virtual networks registration (such as VPC in AWS, vNET in Azure, etc.). Furthermore, instead of discovering reachability to remote VRAs by regular PING, the system can send virtual PING requests to the VRA controller by region name, because remote VRAs might not be active all the time. Also, an emulated layer 2 address resolution protocol (ARP) (IPv4)/ND (IPv6) can scan to discover all the actively attached hosts and subnets within the same region, since, for example, AWS Cloud DCs do not support Layer 2 ARP.

Other features include that the VRA controller can manage and control the overlay virtual networking VRA allow VPC peering across zone and cloud provider, and provides elastic and efficient routing controlled by the overlay owner; the VRA can perform remote telemetry probe function; and the VRA controller can manage the mapping between overlay and underlay network, and compute the routing path among the VPCs across clouds and private network.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively, the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of operating a network device to stitch an existing virtual private network (VPN) with one or more virtual private clouds (VPCs) in one or more public cloud data centers (DCs), comprising:
    communicating over the existing VPN between a plurality of first network devices;
    configuring a virtual routing application in a first VPC in a first public DC;
    configuring one or more virtual routing applications in the existing VPN;
    establishing a plurality of paths between the first network devices in the existing VPN and one or more second networking devices in the first VPC, the plurality of paths including one or more physical connections and one or more virtual connections over non-secure networks;
    configuring a virtual routing application controller in the existing VPN for controlling the virtual routing application in the first VPC and the one or more virtual routing applications in the existing VPN, whereby the virtual routing application controller routes the plurality of first network devices in the existing VPN to access applications instantiated in the first VPC through the paths established between the first network devices and the first VPC;
    establishing a plurality of additional paths between the first network devices in the existing VPN and one or more second networking devices in a second VPC in a second public DC, the plurality of additional paths including one or more physical connections and one or more virtual connections over non-secure networks; and
    configuring a virtual routing application in the second VPC.

2. The method of claim 1, wherein the existing VPN is a multiprotocol label switching (MPLS) based VPN.

3. The method of claim 1, wherein the one or more physical connections include a connection through a peer-to-peer file sharing hub.

4. The method of claim 1, wherein the one or more virtual connections over non-secure networks include an Internet Protocol Security (IPsec) tunnel.

5. The method of claim 4, wherein the IPsec tunnel terminates at a virtual gateway of the first VPC.

6. The method of claim 4, wherein the IPsec tunnel terminates at one of the virtual routing applications in the first VPC.

7. The method of claim 1, wherein the virtual routing application in the first VPC is housed in a virtual machine.

8. The method claim 1, further comprising:
    further configuring the routing application controller for controlling the virtual routing application in the second VPC, whereby the virtual routing application controller routes the plurality of first network devices in the existing VPN to access applications instantiated in the second VPC through the paths between the first network devices and the second VPC.

9. The method of claim 1, further comprising:
    further configuring the virtual routing application controller to route the first network devices to access applications instantiated in the second VPC by routing communications between the first network devices and the second VPC through the first VPC and through the paths between the first network devices in the existing VPN and the one or more second networking devices in the first VPC.

10. The method of any of claim 1, further comprising:
monitoring by the virtual routing application in the first VPC of communications between one or more additional VPCs, including the second VPC, and the plurality of first network devices.

11. A system for implementing a stitching an existing virtual private network (VPN) with one or more virtual private clouds (VPCs) in one or more public cloud data centers (DCs), comprising:
a first network device, comprising:
a network interface configured to exchange communications with one or more networks;
a memory configured to store data and instructions; and
a processor coupled to the memory and the network interface, the processor configured to execute instructions stored in the memory to cause the first network device to:
communicate over the existing VPN with one or more second network devices;
establish a plurality of paths between the first network device and the second network devices in the existing VPN and one or more third networking devices in a first virtual private cloud (VPC) in a first public cloud data center (DC), the plurality of paths including one or more physical connections and one or more virtual connections over non-secure networks;
operate as a virtual routing application controller for controlling a virtual routing application in the first VPC and one or more virtual routing applications in the existing VPN, whereby the virtual routing application controller routes the first network device and the second network devices in the existing VPN to access applications instantiated in the first VPC through the paths established between the first network devices and the first VPC;
establish a plurality of additional paths between the first and second network devices in the existing VPN and one or more third networking devices in a second VPC in a second public DC, the plurality of additional paths including one or more physical connections and one or more virtual connections over non-secure network.

12. The system of claim 11, wherein operating as the virtual routing application controller includes computing routing paths between the first VPC and the first and second network devices.

13. The system of claim 11, wherein the processor is further configured to execute instructions stored in the memory to configure the processor to:
further operate the routing application controller for controlling the virtual routing application in the second VPC, whereby the virtual routing application controller routes the plurality of first and second network devices in the existing VPN to access applications instantiated in the second VPC through the additional paths between the first and second network devices in the existing VPN and one or more third networking devices in the second VPC.

14. The system of claim 11, wherein the processor is further configured to execute instructions stored in the memory to further operate as the virtual routing application controller by routing communications between the first and second network devices and the second VPC through the first VPC and through the paths between the first and second network devices in the existing VPN and the one or more third networking devices to access applications instantiated in the second VPC.

15. The system of claim 11, wherein the processor is further configured to execute instructions stored in the memory to configure the processor to further operate as the virtual routing application controller to monitor the first public cloud data center of communications between one or more additional VPCs, including the second VPC, and the second network devices.

16. A non-transitory computer-readable medium storing computer instructions for stitching an existing virtual private network (VPN) with one or more virtual private clouds (VPCs) in one or more public cloud data centers (DCs), that when executed by one or more processors, cause the one or more processors to perform the process of:
communicating over the existing VPN between a plurality of first network devices;
configuring a virtual routing application in a first VPC in a first public DC;
configuring one or more virtual routing applications in the existing VPN;
establishing a plurality of paths between the first network devices in the existing VPN and one or more second networking devices in the first VPC, the plurality of paths including one or more physical connections and one or more virtual connections over non-secure networks;
configuring a virtual routing application controller in the existing VPN for controlling the virtual routing application in the first VPC and the one or more virtual routing applications in the existing VPN, whereby the virtual routing application controller routes the plurality of first network devices in the existing VPN to access applications instantiated in the first VPC through the paths established between the first network devices and the first VPC;
establishing a plurality of additional paths between the first network devices in the existing VPN and one or more second networking devices in a second VPC in a second public DC, the plurality of additional paths including one or more physical connections and one or more virtual connections over non-secure networks; and
configuring a virtual routing application in the second VPC.

17. The non-transitory computer-readable medium of claim 16, wherein, when executed by the one or more processors, the instructions further cause the one or more processors to perform the process of:
further configuring the routing application controller for controlling the virtual routing application in the second VPC, whereby the virtual routing application controller routes the plurality of first network devices in the existing VPN to access applications instantiated in the second VPC through the paths between the first network devices and the second VPC.

18. The non-transitory computer-readable medium of claim 16, wherein, when executed by the one or more processors, the instructions further cause the one or more processors to perform the process of:
further configuring the virtual routing application controller to route the first network devices to access applications instantiated in the second VPC by routing communications between the first network devices and the second VPC through the first VPC and through the paths between the first network devices in the existing VPN and the one or more second networking devices in the first VPC.

19. The non-transitory computer-readable medium of claim 16, wherein the one or more physical connections include a connection through a peer-to-peer file sharing hub.

20. The non-transitory computer-readable medium of claim 16, wherein the one or more virtual connections over non-secure networks include an Internet Protocol Security (IPsec) tunnel.

* * * * *

UNITED STATES PATENT AND TRADEMARK OFFICE
CERTIFICATE OF CORRECTION

| | | |
|---|---|---|
| PATENT NO. | : 11,588,683 B2 | Page 1 of 1 |
| APPLICATION NO. | : 16/995706 | |
| DATED | : February 21, 2023 | |
| INVENTOR(S) | : Dunbar et al. | |

It is certified that error appears in the above-identified patent and that said Letters Patent is hereby corrected as shown below:

In the Claims

Column 17, Line 6 (Claim 11, Line 1): After "stitching" and before "an" insert -- for --.

Column 17, Line 44 (Claim 11, Line 39): After "non-secure" and before the ".", delete "network" and insert -- networks --.

Signed and Sealed this
Eighteenth Day of April, 2023

Katherine Kelly Vidal
*Director of the United States Patent and Trademark Office*